United States Patent Office 3,329,504
Patented July 4, 1967

3,329,504
FISH STICK WATER AND MOLASSES FERMENTED WITH YEAST TO PREPARE A FEED SUPPLEMENT
Michael Senyi, Mayaguez, Puerto Rico, assignor to Liquidos Diversificados, S.A., a corporation of Delaware
No Drawing. Filed Aug. 28, 1964, Ser. No. 392,951
12 Claims. (Cl. 99—9)

The present invention relates to a feed composition for cattle and other livestock to be utilized as a supplement to or complete substitute for other forms of feed, and to a method of making it. The feed is derived from a waste product of fish canning and molasses by a fermentation process to be described in detail hereinafter.

In the scientific feeding of livestock, a variety of synthetic feeds have been used, particularly to increase the nitrogen intake of the animals. Nitrogen is utilized by the animals in the synthesis of protein. Grains and other plant foods contain protein and are the traditional feed for, say, cattle. However, supplements have been used which are more rich in nitrogen or supply it in a more readily utilized form. These supplements are capable of increasing the rate of growth of the animals, with consequent economic advantages.

Among supplements for cattle, it is known to utilize synthetic nitrogen sources, i.e., materials which are believed to be converted to protein by microflora, organisms which inhabit the rumen. The synthetic nitrogen sources are thought to be consumed by the microflora and then the microflora are digested by the animal in the abomasum. A typical source of synthetic nitrogen is urea. The urea is, for example, mixed with molasses, which is a relatively inexpensive and concentrated source of carbohydrate.

Supplements based on synthetic nitrogen sources must be used with a degree of caution. If they are not properly prepared, they will not have good flavor and will not be consumed by the animals. On the other hand, if they have good flavor, they may be consumed in excess. Then there is a risk of overeating which may cause illness, particularly if the supplement does not provide balanced nutrition. The urea is, for example, mixed with molasses, which is a relatively inexpensive and concentrated source of carbohydrate.

It is considered preferable to utilize in supplements nitrogen in natural form, i.e., protein and amino acids. These materials are, of course, more costly and objectionable on that ground.

Certain waste products which contain natural protein have been used which are available at a sufficiently low price. In particular, work has been done in feeding to cattle, as a supplement, a product known as fish solubles. This is obtained as a waste product in canning fish such as tuna and salmon. The manner in which this product is obtained is well known and will be described herein only briefly.

In a cannery, fish is first cooked in water or more commonly steam. The steam extracts natural oils, proteins and other nutrients, and is condensed and separated from the fish meat. The liquid thus obtained is referred to as cooker water. The heads and other waste portions of the fish are removed and pressed to extract water, prior to converting to fish flour, and the liquid separated is known as press water. Then the two liquids are added to each other, and the liquid obtained is known as stick water. It will be understood that this is a kind of fish soup. It usually contains on the order of 4–7%, most commonly about 5%, solids. The stick water is fairly quickly concentrated in an evaporator, operating at elevated temperature and under partial vacuum, to 50% solids; the liquid obtained is known as fish solubles. It is particularly significant that in carrying out these steps, where necessary, precautions are taken to avoid any spoiling or fermentation, which would make the material unpalatable and possibly unsafe. As will be seen further herein, this is an important distinction, since in the present process, stick water is deliberately subjected to fermentation and is converted to a material which is resistant to spoiling. Furthermore, fish solubles, in general, when combined with molasses, do not provide a taste which cattle like.

In accordance with the present invention, stick water is combined with molasses and ordinary brewer's yeast and fermented. A material is obtained which is best described as a beer and this is distilled in a manner similar to that known in the making of whiskey. A high proof distillate or beverage spirits is obtained which might be referred to herein as a kind of rum. It will be appreciated that the distillate is not the ordinary kind of rum obtained by fermentation and distillation of molasses and other cane sugar extracts, since it also contains constituents derived from the stick water.

The undistilled slops are collected and then concentrated, for example, by evaporation in equipment of the type used in making fish solubles. Concentration is continued until the solids content is increased to about 50–60%. Then, the distilled spirits is recombined with the concentrate, and additional molasses is added. The result is a feed supplement which is palatable to all livestock and also provides a balance of nutrition.

Any ordinary form of molasses, derived from cane sugar or beet sugar, may be used both in the fermentation and as an additive to the fermentation products. One suitable form is the grade known and sold to the trade as mill run grade molasses.

Certain other additives may be employed in practicing the invention, for the purpose of controlling fermentation. For example, sulfuric acid may be introduced to reduce the pH to the range 4.3–5.5, preferably 4.8–4.9. This is a known step in the making of rum, since the yeast will not grow and function properly at another pH. Similarly, various known nutrients for the yeast may also be added. Stick water has a pH near neutral (7.0) and molasses may be acid. Hence in some cases no pH controlling additive will be necessary. As will be understood, too great a departure from the optimum pH will lead to uncontrolled fermentation and possible production of undesired products such as acetone. A fermentation chemist can readily determine by known techniques such as analysis of gases emitted and microscopic examination when changes should be made to keep the fermentation functioning smoothly to produce alcohols.

The relative amounts of stick water and molasses used for fermentation is subject to variation, depending in part on the proportion of water in each. In general, the volume of the rum is controlled by the amount of carbohydrate in the molasses and the amount of molasses is selected on a basis of the amount of rum desired in the final product. This can be computed with knowledge of the fact that 2½ gallons of molasses gives about 1 gallon of rum. When the molasses and stick water are combined, the water content should be adjusted, if necessary, by adding water. The amount required is determined by the amount of alcohol to be produced. As is well known, fermentation will cease when the alcohol content rises to 8%. Consequently, sufficient water must be present that, when all of the carbohydrate is fermented, the proportion of alcohol is less than 8%. In addition, fermentation is not possible when the solids content is above 50%, so that a lower solids content is used. Taking into account the amount of rum to be produced, ordinarily the solids content will be lower than 30%.

Brewer's yeast is used for two purposes in the invention. Thus, it is a useful source of protein for the animals and in addition causes fermentation. The amount required for fermentation is essentially the same as in fermentation of molasses and is known to those skilled in the art. Thus, in fermenting a batch of about 12,000 gallons, there should be at least about 80 lbs. of yeast. In general, in practicing the invention, more is used, for example, about 400 lbs.

The fermentation is carried out at low temperature, below 90–92° F. It is started at room temperature, and may rise because of the action of the yeast. However, unless the temperature is kept below 90–92° F., uncontrolled fermentation may take place. Other conventional fermentation techniques will be used, such as sterilizing, use of air for agitation, etc.

Fermentation is allowed to continue substantially to completion, i.e., until it stops for lack of fermentable material. This usually requires about 48 hours.

The beer is distilled in any type of still suited for the making of whiskey. For example, the type which has a plurality of plates one over the other in a column may be used. Steam is introduced at the base. Distillate is removed at the top and slops at the base. As is known, the proportion of alcohol in the distillate, i.e., the proof, may be controlled by adjusting the reflux ratio. In the present process, this is adjusted so that the rum is 160–190 proof.

The distillate contains several alcohols, ethyl, propyl and butyl, for example, and fusel oil which contains amyl alcohol. It has a distinct odor, somewhat like fish solubles and somewhat like rum, and is a clear, colorless liquid.

The slops recovered at the base of the still is next concentrated, e.g., by evaporation of water. Caution preferably is taken to avoid oxidation during this stage, since certain vitamins, enzymes and other constituents might be destroyed. Thus it is desirable to carry out the step of the process under vacuum. If heat is applied, it should be moderate, preferably below 180° F. During the concentration step, the solids content of the slops is raised to 50%–60%. The concentration should be at least 50% solids, since this prevents further spoiling. A concentration of above about 60% is undesirable since the material then is not sufficiently fluid.

Then the rum and concentrated slops are recombined. It will be understood that the distillation step removes the alcohol so that water may be removed by evaporation and discarded. The relative amounts of concentrate and rum may vary, but preferably the rum is about 10–35% of the total weight of rum and concentrate.

The resultant mixture is combined with molasses in any desired amount, and, in some cases, water may be added so long as the solids content remains above 50%. Highly satisfactory results are obtained with three parts of molasses for one part of the mixture of concentrate and rum. Preferably, however, there is at least one part of the mixture for each ten parts of molasses.

It is not necessary to add the molasses immediately. For example, if the product is to be used in a place where molasses is available locally, costs may be reduced by shipping the rum-concentrate mixture and adding molasses at the destination.

The process is illustrated by the following example:

In a large open vat 700 gallons of tuna stick water having a solids content of 7% was mixed with 75 gallons of mill run grade molasses. Sulfuric acid also was added until the pH was 4.8, followed by 40 lbs. of brewer's yeast. The mixture was agitated with air as necessary for 48 hours while its temperature was kept below 90° F. by cooling coils in contact with the liquid, and then passed into a vertical still column. The reflux ratio was adjusted so that about 30 gallons of rum distilled over having a proof of 180. The slops recovered at the base of the still was passed through an evaporative concentrator and the solids content was raised to about 50% to give about 100 gallons of concentrate. Then the concentrate and rum were recombined and 370 lbs. of molasses was added.

One of the principal advantages of the new process is that it converts fish waste into a form which cattle like to eat. The material known as fish solubles, when mixed with molasses, is not palatable to cattle. However, when the stick water, from which the fish solubles are made, is subjected to fermentation with molasses as described above, there appear to be changes in the protein and other constituents of the stick water. It is thought that this is caused by enzymatic action. The change in constitution also changes the flavor and, when it is mixed with molasses, cattle find the flavor very satisfying. Thus, the usefulness of fish solubles as a feed for cattle is considerably increased.

In undergoing the changes which take place in fermentation, the nutritional value of the fish constituents is not reduced but actually increased. The protein is believed to undergo certain changes which may be more readily utilized by the animal and certain unknown nutrient factors are formed. Furthermore, the alcohol produced has a tendency to relax the animal and thus improve his appetite and digestive processes.

Another advantage is that the supplement is liquid and is easily shipped to countries where ordinary cattle feeds are not available. It is a concentrated source of nutrition, thus being more economical of shipping costs than, say, grain feeds.

It will be understood that, while the foregoing description has referred particularly to cattle feeding, the feed is useful with other animals such as hogs and sheep. Various changes may be made in the details of the process and in the materials used without departing from the scope of the invention, as defined in the claims.

I claim:

1. A process for the manufacture of a feed for livestock which comprises fermenting a mixture consisting essentially of molasses, fish stick water and yeast until fermentable sugar in said molasses is converted to ethyl alcohol.

2. A feed supplement manufactured by the process of claim 1.

3. A process for the manufacture of a feed for livestock as set forth in claim 1 in which sulfuric acid is added to said mixture to reduce the pH.

4. A process for the manufacture of a feed for livestock which comprises fermenting a mixture consisting essentially of molasses, fish stick water and yeast having a solids content less than about 30% at a temperature below about 92° F. and at a pH of about 4.3 to 5.5 until fermentable sugar in said molasses is converted to ethyl alcohol.

5. A process for the manufacture of a feed for livestock which comprises fermenting a mixture consisting essentially of molasses, fish stick water and brewer's yeast until fermentable sugar in said molasses is converted to ethyl alcohol, distilling the resultant beer to obtain a distilled spirits and undistilled slops, removing a portion of the water from said slops to form a concentrate and recombining the slops with the distilled spirits.

6. A process for the manufacture of a feed for livestock as set forth in claim 5 including the step of adding molasses to the mixture of distilled spirits and concentrate.

7. A process for the manufacture of a feed for livestock as set forth in claim 5 in which the pH during the fermentation is in the range about 4.3 to 5.5.

8. A process for the manufacture of a feed for livestock as set forth in claim 7 in which the pH is in the range 4.8–4.9.

9. A process for the manufacture of a feed for livestock as set forth in claim 7 including maintaining the temperature below about 92° F. during the fermentation.

10. A process as set forth in claim 5 in which said distilled spirits is 160–190 proof.

11. A process as set forth in claim 5 in which said concentrate contains at least about 50% solids.

12. A process as set forth in claim 11 in which said concentrate contains about 50–60% solids.

References Cited

UNITED STATES PATENTS

| | | | |
|---|---|---|---|
| 2,165,950 | 7/1939 | Willkie et al. | 99—5 |
| 2,222,306 | 11/1940 | Atwood | 99—5 |
| 2,313,275 | 3/1943 | Schopmeyer | 99—9 |
| 2,808,332 | 10/1957 | Anderson et al. | 99—2 |
| 3,002,828 | 10/1961 | Hughes et al. | 99—9 |
| 3,170,794 | 2/1965 | Jeffreys et al. | 99—9 |

A. LOUIS MONACELL, *Primary Examiner.*

D. J. DONOVAN, *Examiner.*